(12) United States Patent
Shaikh et al.

(10) Patent No.: US 7,778,180 B2
(45) Date of Patent: Aug. 17, 2010

(54) DYNAMIC MULTI-HOP NEGOTIATIONS

(75) Inventors: Mohammed T. Shaikh, Fremont, CA (US); Todd M. Baker, Los Altos, CA (US); Sabita Jasty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 400 days.

(21) Appl. No.: 11/709,512

(22) Filed: Feb. 21, 2007

(65) Prior Publication Data
US 2008/0198745 A1    Aug. 21, 2008

(51) Int. Cl.
*H04L 12/28* (2006.01)
(52) U.S. Cl. .................... 370/235; 370/231
(58) Field of Classification Search ............ 370/468, 370/329, 254, 352
See application file for complete search history.

(56) References Cited

U.S. PATENT DOCUMENTS

| | | | |
|---|---|---|---|
| 7,289,490 B1* | 10/2007 | Kalmanek et al. | 370/352 |
| 2003/0235187 A1* | 12/2003 | Iwama et al. | 370/352 |
| 2007/0076629 A1* | 4/2007 | Ashwood-Smith et al. | 370/254 |
| 2007/0086485 A1* | 4/2007 | Vega-Garcia et al. | 370/468 |
| 2008/0130563 A1* | 6/2008 | Xu et al. | 370/329 |

* cited by examiner

*Primary Examiner*—Kwang B Yao
*Assistant Examiner*—Syed Bokhari
(74) *Attorney, Agent, or Firm*—Haynes & Boone, LLP.

(57) ABSTRACT

Negotiation of RSVP reservations prior to the setup of a call, rather than negotiating reservation parameters during the call. RSVP reservation parameters are negotiated prior to ringing a device, rather than after. In some embodiments, this is achieved by including information in the initial call signaling elements. This added information allows negotiation with each device in the proposed data path to determine, prior to ringing the terminating device in the data path, whether each of the devices can support the proposed data link.

18 Claims, 3 Drawing Sheets

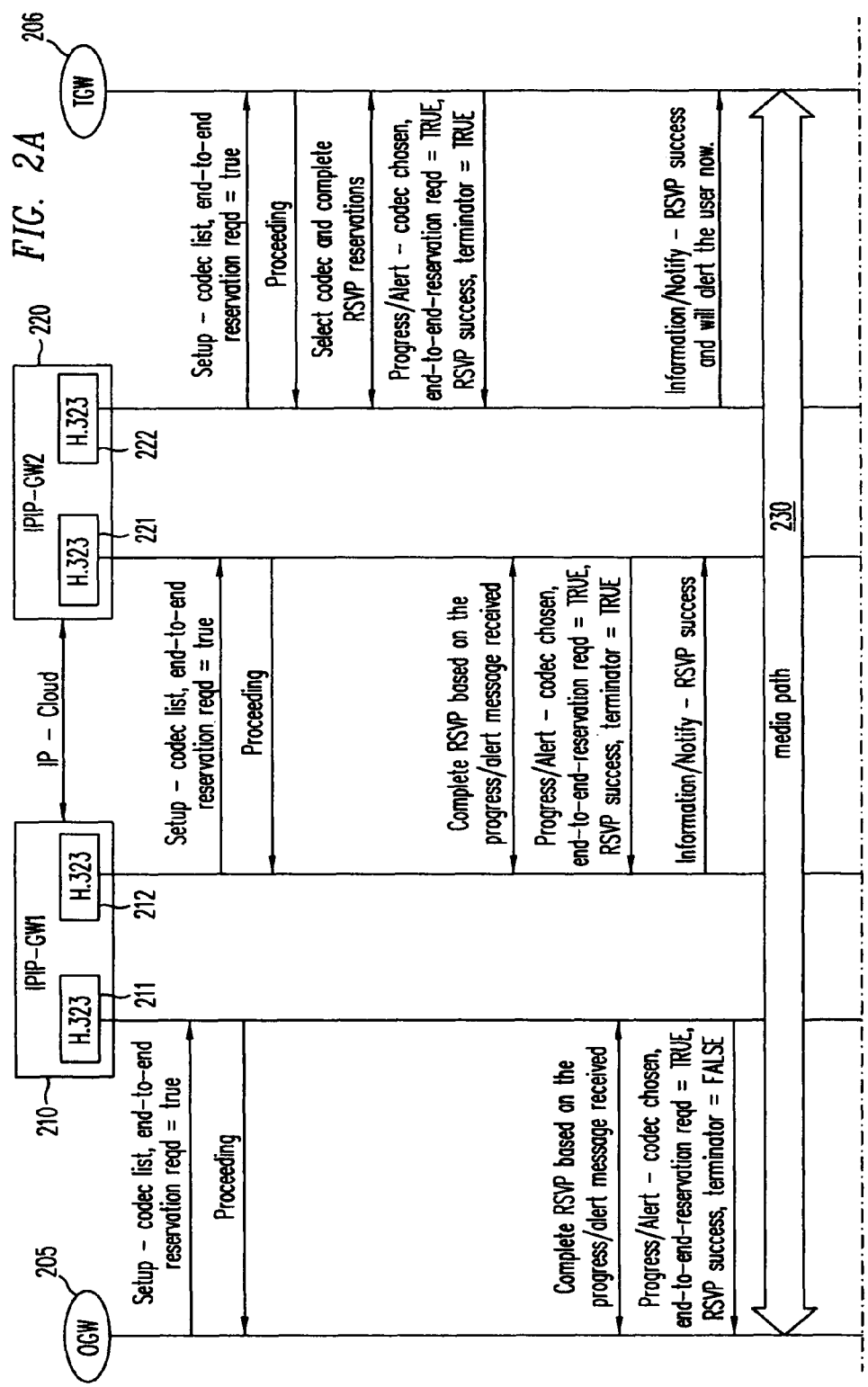

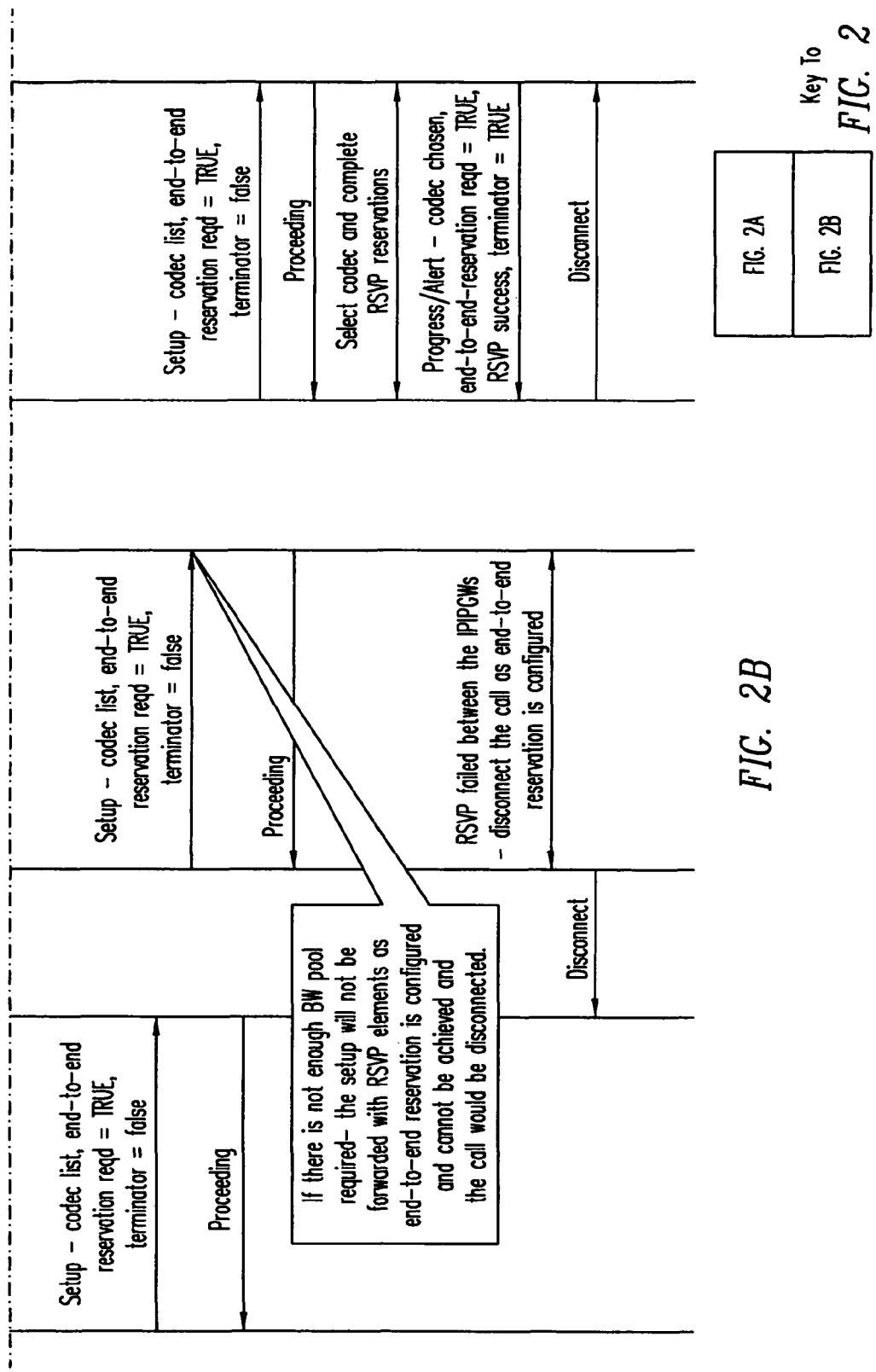

DYNAMIC MULTI-HOP NEGOTIATIONS

TECHNICAL FIELD

The present disclosure relates generally to quality of service in Internet communication.

BACKGROUND

The Resource Reservation Protocol (RSVP) is a network-control protocol that enables Internet applications to obtain differing qualities of service (QoS) for their data flows. Such a capability recognizes that different applications have different network performance requirements.

Some applications, including the more traditional interactive and batch applications, require reliable delivery of data but do not impose any stringent requirements for the timeliness of delivery. Newer application types, including videoconferencing, IP telephony, and other forms of multimedia communications require almost the exact opposite: Data delivery must be timely but not necessarily reliable. Thus, RSVP was intended to provide IP networks with the capability to support the divergent performance requirements of differing application types.

With the advent of network elements such as Session Border Controllers (SBC), RSVP is more easily used with rich services such as Voice over Internet Protocol (VoIP). Using SBCs, Internet technology professionals may now set up sessions that include both RSVP enabled and non-RSVP enabled devices. However, this approach is inefficient when multiple intermediary hops are used. The inefficiency may add significantly to the overhead of the communication. Additionally, there currently is no method to notify all elements in a given session of the presence or absence of RSVP in the flow.

Some current VoIP systems approach this problem by performing hop-by-hop negotiations during call setup, by tunneling RSVP between nodes, or by some hybrid of the two. In an example of a hop-by-hop negotiation, if there are two intermediate elements in the network (a-Int1-Int2-b), by the time the setup process reaches node b, the system will have set up two reservations prior to negotiating the bandwidth for the call. Instead, the reservations assume that the call with use a maximum bandwidth. That is, hop-to-hop negotiations only define the data path RSVP negotiations and do not take into account the application layer negotiations used to actually complete an end-to-end connection for transmission of the rich media over IP.

This technique is inefficient, since the reservations frequently need to be re-established to bring them in line with the actual utilization. Additionally, the reservation process is performed even when end-to-end reservation is required and some elements of the network do not support RSVP. Since RSVP cannot be used in such a situation, the reservation process wastes resources.

BRIEF DESCRIPTION OF THE DRAWINGS

For a better understanding of the invention, reference should be made to the following detailed description taken in conjunction with the accompanying drawings, in which:

FIG. 2A shows an RSVP reservation process, according to some embodiments; and

FIG. 2B shows an RSVP reservation process where RSVP is not configured on all elements of the network.

Like reference symbols in the various drawings indicate like elements.

DETAILED DESCRIPTION

Overview

Figure 1:
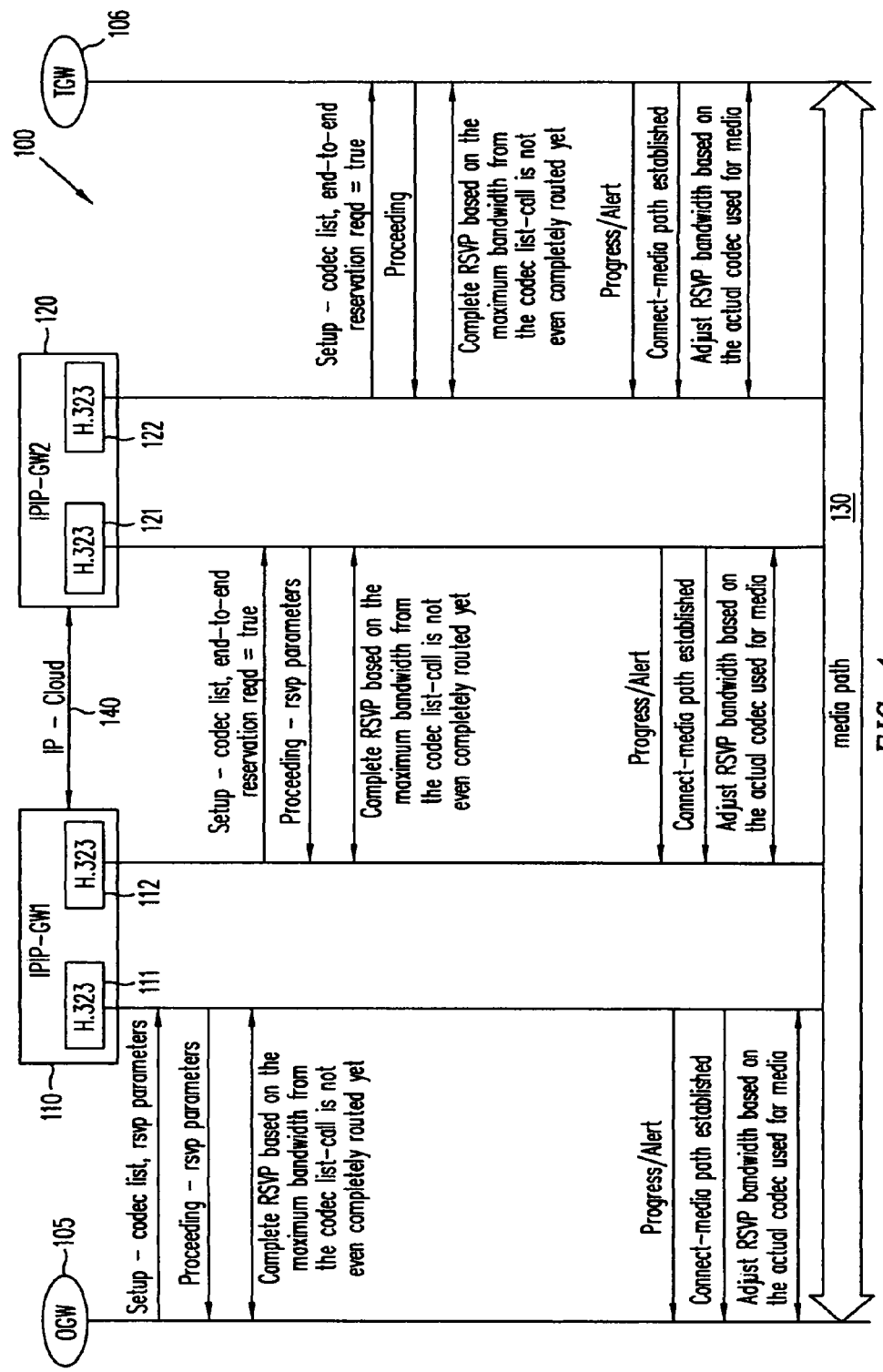
FIG. 1 shows an RSVP reservation process.

Example embodiments of the invention relate to the negotiation of RSVP reservations prior to the setup of a call, rather than negotiating reservation parameters during the call. That is, RSVP reservation parameters are negotiated prior to ringing a device, rather than after. In some embodiments, this is achieved by including information in the initial call signaling elements. This added information allows negotiation with each device in the proposed data path to determine, prior to ringing the terminating device in the data path, whether each of the devices can support the proposed data link.

Description of Example Embodiments

FIG. 1 illustrates an existing implementation of an RSVP reservation technique for a network 100 including an originating gateway OGW 105 and a terminating gateway TGW 106. Network 100 further includes a first IPIP (IP encapsulation within IP) gateway 110 and a second IPIP gateway 120. IPIP gateways 110 and 120 include H.232 input interfaces 111 and 121 and H.232 output interfaces 112 and 122 to implement H.323 protocol for rich media services. The gateways 105, 106 are shown here as originating and terminating gateways for purposes of illustration, but can be any devices acting as endpoints of a data path, such as voice gateways, video terminals, and the like. Similarly, the gateways 110, 120 are shown as IPIP gateways, but can be any devices capable of interacting in a data path for flows requiring bandwidth reservations.

FIG. 1 illustrates RSVP reservation for a connection between OGW 105 and TGW 106 along a media path 130. After establishment of the connection, media (e.g., data indicative of voice, data indicative of video) is transmitted along media path 130 until the call is terminated.

At initiation of the call, OGW 105 transmits setup information to input interface 111 of IPIP gateway 110. The setup information may include a codec list and RSVP parameters.

In response, IPIP gateway 110 transmits proceeding information including RSVP parameters to OGW 105. The RSVP reservation is completed based on the maximum bandwidth from the codec list, rather than on a negotiation of the bandwidth that the call will actually use.

Similarly output interface 112 of IPIP gateway 110 transmits setup information to input interface 121 of IPIP gateway 120 via IP-cloud 140. IP-cloud 140 designates an IP connection that may include one or more network elements that are not RSVP enabled. Output interface 112 transmits setup information including a codec list, and RSVP parameter information, with the end-to-end reservation required condition set to true. Input interface 121 responds with proceeding information including RSVP parameters, and again the RSVP reservation is completed based on the maximum bandwidth from the codec list.

Output interface 122 then transmits setup information to TGW 106, where the setup information indicates that the parameter end-to-end reservation required=true, and also includes a codec list. TGW 106 transmits proceeding information to output interface 122, and the RSVP reservation is completed based on the maximum bandwidth for the codec list.

TGW 106 then transmits progress or alert information to output interface 122, which is transmitted back to OGW 105 via IPIP gateway 110. A connection is then established, and media may be transmitted between OGW 105 and TGW 106 via a media path 130. Once the connection is established, TGW 106, OGW 105, and IPIP gateways 110 and 120 adjust the RSVP bandwidth based on the actual codec used for the media transmission.

Systems and techniques described herein may provide enhanced RSVP methodology for end-to-end signaling with rich media services, such as VoIP. Rather than negotiating RSVP reservations using a hop-by-hop negotiation as above, RSVP reservation is moved up a layer. Information about the RSVP capabilities of call-termination nodes in the network is included in the initial call signaling. The RSVP reservation itself may be negotiated during the reverse path acknowledgments of appropriate characteristics and capabilities, before a TGW is rung.

The RSVP information included in initial signaling information may include additional indicators or desired characteristics, such as one or more of: the maximum per-call reservation allowed, RSVP service availability, bandwidth remaining in application bandwidth pool, whether end-to-end reservation is required, and a reservation terminator (which may be a Boolean parameter). In some embodiments, these new message elements are protocol independent, and may be embedded within existing signaling models for H.323/SIP (Session Initiation Protocol), as can be observed by one of ordinary skill in the art. The new message elements may be a super-set of the hop-by-hop techniques, so that if one or more of the signaling termination devices do not support the new techniques, RSVP negotiation can default to hop-by-hop.

FIG. 2 shows an RSVP reservation technique for a network 200, according to some embodiments. Network 200 includes an originating gateway OGW 205 and a terminating gateway TGW 206. Network 200 further includes a first IPIP gateway 210 and a second IPIP gateway 220. IPIP gateways 210 and 220 include H.232 input interfaces 211 and 221 and H.232 output interfaces 212 and 222 to implement an H.323 protocol for rich media services.

FIG. 2A illustrates an RSVP reservation process for completing a connection between OGW 205 and TGW 206 along a media path 230. After establishment of the connection, media (e.g., data indicative of voice, data indicative of video) is transmitted along media path 230 until the call is terminated.

At initiation of the call, OGW 205 transmits setup information to input interface 211 of IPIP gateway 210. The setup information may include a codec list and RSVP parameters. IPIP gateway 210 transmits proceeding information to OGW 205. During this portion of the negotiation, a tentative bandwidth $B_t$ is negotiated, where Bt is the maximum bandwidth that can be supported by this portion of the link under the current conditions. For example, if a 1 MB reservation can be accommodated between IPIP gateway 210 and OGW 205, $B_t$ is set to 1 MB. IPIP gateway 210 also determines whether it can support a call according to whichever additional indicators or desired characteristics are included in the RSVP signaling information.

If the IPIP gateway 210 can support a call as specified by the signaling information, output interface 211 of IPIP gateway 210 then sends setup information to input interface 221 of IPIP gateway 220 over IP cloud 240. IPIP gateway 220 sends proceeding information to IPIP gateway 210. For this part of the overall RSVP negotiation, $B_t$ is updated if the link between IPIP gateway 210 and IPIP gateway 220 cannot accommodate the current $B_t$. For example, if the link can only accommodate a 500 KB bandwidth, Bt is reset to 500 KB.

Assuming that IPIP gateway 220 can also support a call as specified by the signaling information, output interface 222 of IPIP gateway 220 then transmits setup information to TGW 206. $B_t$ may be updated if the link between IPIP gateway 220 and TGW 206 cannot accommodate the current $B_t$. At this point, TGW 206 may determine if Bt, which now reflects the maximum end-to-end reservation bandwidth, is at least equal to the required capability for the particular call (the minimum acceptable bandwidth). If not, an alert such as a "insufficient network resources available" alert can be generated. This portion of the signaling process may be performed prior to ringing the device at TGW 206.

If Bt is sufficient to accommodate the call, and if the other parameters specified in the RSVP signaling information are satisfied, TGW 206 may transmit progress/alert information back along the signaling path. This information may indicate the identity of the chosen codec, indicate that the end-to-end reservation reqd parameter is set to TRUE, and indicate that RSVP success, and a terminator parameter is set to TRUE. IPIP gateway 220 may receive this information and complete the RSVP reservation based on the progress/alert information. IPIP gateway 220 may send progress/alert information to IPIP gateway 210, which also completes the RSVP reservation based on the received progress/alert information. IPIP gateway 210 sends progress/alert information to OGW 205.

OGW 205 receives the progress/alert information from IPIP gateway 210, and sets the terminator parameter to FALSE, indicating that the call will progress. Media path 230 is thus established with the correct bandwidth. As the call bandwidth has already been negotiated, no bandwidth adjustment need be performed at this point.

FIG. 2B shows an embodiment in which the call cannot be set up. Initiation of the call can begin as in FIG. 2A, with OGW 205 transmitting setup information to input interface 211 of IPIP gateway 210, and IPIP gateway 210 transmitting proceeding information to OGW 205. As before, a Bt is negotiated during this time. Output interface 211 then sends setup information to input interface 221, and IPIP gateway 220 returns proceeding information to IPIP gateway 210.

At any point, if insufficient bandwidth exists, or if one of the other call characteristics cannot be satisfied, the RSVP elements are removed from the setup information sent to the next network element. Here, for example, if IPIP gateway 220 determines that it cannot support the call, its forwarded message to TGW 206 omits the RSVP elements of its setup information. The IPIP gateway 220 then sends a message back to IP gateway 210 indicating that RSVP failed, and disconnects from TGW 206.

In implementations, the above described techniques and their variations may be implemented at least partially as computer software instructions. Such instructions may be stored on one or more machine-readable storage media or devices and are executed by, e.g., one or more computer processors, or cause the machine, to perform the described functions and operations.

One of ordinary skill in the art will realize that the approach described above in connection with FIGS. 2A-2B is a specific implementation, and that various other embodiments of the invention exist for allowing devices in a proposed data path, such as IPIP gateways, to negotiate RSVP parameters of a call prior to ringing the end device. Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method for use with a device in a data path, comprising:
   receiving from a first device along the data path a Resource Reservation Protocol (RSVP) reservation request for the data path;
   negotiating an RSVP reservation with the first device according to a tentative bandwidth, wherein the tentative bandwidth for the data path is determined as a maximum bandwidth available that can be supported by a first portion of the data path to the first device;
   negotiating an RSVP reservation with a second device along the data path, wherein:
      the tentative bandwidth remains unchanged if a second portion of the data path to the second device can support the data path at the tentative bandwidth; and
      the tentative bandwidth is revised if the second portion of the data path to the second device cannot support the data path at the tentative bandwidth, so as to form a revised tentative bandwidth as the maximum bandwidth available that can be supported by both the first and second portions of the data path;
   if the tentative bandwidth has been revised, re-negotiating the RSVP reservation with the first device at the revised tentative bandwidth;
   transmitting to the second device an end-to-end reservation bandwidth, wherein the end-to-end reservation bandwidth is the tentative bandwidth if the tentative bandwidth remained unchanged, and is the revised tentative bandwidth if the tentative bandwidth was revised; and
   if the end-to-end reservation bandwidth is at least equal to a minimum acceptable bandwidth for a call, completing the RSVP reservation.

2. The method of claim 1, wherein the first device is an originating gateway of the data path.

3. The method of claim 1, wherein the second device is a terminating gateway of the data path.

4. The method of claim 3 wherein the transmitting is performed prior to a ringing of the second device.

5. The method of claim 3 further comprising, prior to performing a ringing of the second device:
   receiving an alert from the second device, the alert corresponding to a denial of the RSVP reservation request; and
   transmitting a denial of the RSVP reservation request.

6. The method of claim 3, further comprising:
   receiving an acceptance signal from the second device, corresponding to support by the second device for the data path at the revised tentative bandwidth; and
   in response to the acceptance signal, transmitting a complete RSVP signal to the first device, so as to facilitate establishment of the data path at the revised tentative bandwidth.

7. The method of claim 1, wherein the RSVP reservation request includes one or more of:
   a first indicator of a maximum per-call reservation allowed;
   a second indicator of RSVP service availability;
   a third indicator of bandwidth remaining in a bandwidth pool of an application;
   a fourth indicator of whether an end-to-end reservation is required; and
   a fifth indicator of a reservation terminator.

8. The method of claim 7 wherein the negotiating further comprises:
   receiving at least one of the first indicator, the second indicator, the third indicator, the fourth indicator, and the fifth indicator, so as to form a received one or more indicators; and
   determining whether the second device can support the data path according to the received one or more indicators.

9. The method of claim 8 wherein the received one or more indicators is formatted according one or more of an H.323 protocol and a Session Initiation Protocol (SIP) protocol.

10. A method for use with a device in a data path, comprising:
    receiving an RSVP reservation request for a data path, the RSVP reservation request including one or more characteristics of the data path;
    negotiating an RSVP reservation with a first device along the data path according to a tentative bandwidth, wherein the tentative bandwidth for the data path is determined as a maximum bandwidth available that can be supported by a first portion of the data path to the first device;
    negotiating an RSVP reservation with a second device along the data path, including:
       determining whether a second portion of the data path to the second device along the data path can support the data path at the tentative bandwidth;
       determining whether the second device can support the data path according to the one or more characteristics; wherein:
       the tentative bandwidth remains unchanged if a second portion of the data path to the second device can support the data path at the tentative bandwidth; and
       the tentative bandwidth is revised if the second portion of the data path to the second device cannot support the data path at the tentative bandwidth, so as to form a revised tentative bandwidth as the maximum bandwidth available that can be supported by both the first and second portions of the data path; and
    if the tentative bandwidth has been revised, re-negotiating the RSVP reservation with the first device at the revised tentative bandwidth;
    transmitting to the second device an end-to-end reservation bandwidth, wherein the end-to-end reservation bandwidth is the tentative bandwidth if the tentative bandwidth remained unchanged, and is the revised tentative bandwidth if the tentative bandwidth was revised; and
    if the end-to-end reservation bandwidth is at least equal to a minimum acceptable bandwidth for a call, and the second device can support the data path according to the one or more characteristics, completing the RSVP reservation.

11. The method of claim 10, further comprising: receiving an acceptance signal, the acceptance signal corresponding to support for the data path at the revised tentative bandwidth; and transmitting a complete RSVP signal, so as to facilitate establishment of the data path at the revised tentative bandwidth.

12. The method of claim 10, further comprising: upon an inability to support the data path at the revised tentative bandwidth, receiving an alert from the second device; and in response to the alert, transmitting a denial of the RSVP reservation request.

13. The method of claim 10, wherein the one or more characteristics include one or more of:
- a maximum per-call reservation allowed;
- an RSVP service availability;
- a bandwidth remaining in a bandwidth pool of an application;
- an end-to-end reservation requirement; and
- a reservation terminator.

14. The method of claim 13, further comprising:
- receiving an acceptance signal, the acceptance signal corresponding to support for the data path according to the one or more characteristics; and
- transmitting a complete RSVP signal, so as to facilitate establishment of the data path according to the one or more characteristics.

15. The method of claim 13, further comprising:
- upon an inability to support the data path according to the one or more characteristics, receiving an alert from the second device; and
- in response to the alert, transmitting a denial of the RSVP reservation request.

16. The method of claim 13 wherein the one or more characteristics are formatted according to at least one of an H.323 protocol or a Session Initiation Protocol (SIP) protocol.

17. Logic for use with a device in a data path and encoded in one or more non-transitory tangible media for execution and when executed operable to: receive a Resource Reservation Protocol (RSVP) reservation request for a data path, the RSVP reservation request including one or more characteristics of the data path; negotiate an RSVP reservation with a first device along the data path according to a tentative bandwidth, wherein the tentative bandwidth for the data path is determined as a maximum bandwidth available that can be supported by a first portion of the data path to the first device; negotiate an RSVP reservation with a second device along the data path, including; determining whether a second portion of the data path to the second device along the data path can support the data path at the tentative bandwidth; determining whether the second device can support the data path according to the one or more characteristics; wherein: the tentative bandwidth remains unchanged if a second portion of the data path to the second device can support the data path at the tentative bandwidth; and the tentative bandwidth is revised if the second portion of the data path to the second device cannot support the data path at the tentative bandwidth, so as to form a revised tentative bandwidth as the maximum bandwidth available that can be supported by both the first and second portions of the data path; and if the tentative bandwidth has been revised, re-negotiate the RSVP reservation with the first device at the revised tentative bandwidth; transmit to the second device an end-to-end reservation bandwidth, wherein the end-to-end reservation bandwidth is the tentative bandwidth if the tentative bandwidth remained unchanged, and is the revised tentative bandwidth if the tentative bandwidth was revised; and if the end-to-end reservation bandwidth is at least equal to a minimum acceptable bandwidth for a call, and the second device can support the data path according to the one or more characteristics, complete the RSVP reservation.

18. The logic of claim 17, wherein the one or more characteristics include one or more of:
- a maximum per-call reservation allowed;
- an RSVP service availability;
- a bandwidth remaining in a bandwidth pool of an application;
- an end-to-end reservation requirement; and
- a reservation terminator.

* * * * *